United States Patent Office 3,352,931
Patented Nov. 14, 1967

3,352,931
CATALYTIC OLIGOMERIZATION OF
BUTADIENE
Ernest A. Zuech, Bartlesville, Okla., assignor to Phillips Petroleum Company, a corporation of Delaware
No Drawing. Filed Aug. 16, 1965, Ser. No. 480,144
9 Claims. (Cl. 260—666)

This invention relates to the oligomerization of conjugated dienes. In one aspect, this invention relates to novel catalysts for the oligomerization of conjugated dienes. In another aspect, it relates to a process for producing novel catalysts for the oligomerization of conjugated dienes. In a still further aspect, the invention relates to a process for the oligomerization of conjugated dienes.

Various processes have been developed for the dimerization and trimerization of conjugated dienes. For example, when 1,3-butadiene is contacted with a catalyst system comprising an organoaluminum such as triethylaluminum and a reducible metal halide such as titanium tetrachloride, good yields of 1,5,9-cyclododecatriene can be obtained. Other processes have been developed for converting butadiene to dimers, including both vinylcyclohexene and 1,5-cyclooctadiene. Since these cyclic dimers and trimers are useful as intermediates for the production of a wide variety of compounds, processes for the production of these oligomers in good yields have considerable potential value. For example, cyclooctadiene can be hydrogenated to cyclooctene and cyclooctane which in turn can be oxidized to suberic acid which is useful in the preparation of polyesters and polyamides.

One drawback to the commercial development of such dimerization and trimerization processes has been the cost of the components of the various catalyst systems. Most organometal reducing agents are relatively expensive, and many of the reducible metal halides are likewise costly.

It is therefore the object of this invention to provide a new economical catalyst system for the conversion of butadiene to cyclic oligomers.

Another object of this invention is to provide a process for the oligomerization of conjugated dienes.

Other objects, aspects, and the several advantages of this invention will be readily apparent from the following disclosure and the appended claims.

According to this invention, 1,3-butadiene is converted to cyclic dimers and trimers by contact with a catalyst formed on admixing a nickel compound and an alkali metal hydride in the presence of a polyene electron donor. The catalyst employed in the oligomerization process of this invention is formed by admixing a nickel compound with an alkali metal hydride in the presence of a polyene electron donor, and preferably in the presence of a catalyst formation diluent.

Any nickel compound can be employed as one component in the catalyst system of this invention, but it is preferred to employ nickel salts of organic and inorganic acids. Some examples of nickel compounds which can be employed in the process of this invention are nickel chloride, nickel nitrate, nickel sulfate, nickel phosphate, nickel formate, nickel acetate, nickel propionate, nickel benzoate and the like.

The reducing agents which are employed in the catalyst system of this invention are the alkali metal hydrides, including the complex hydrides containing alkali metals. Typical hydrides which can be employed are sodium hydride, lithium hydride, potassium hydride, cesium hydride, rubidium hydride, lithium aluminum hydride, sodium borohydride and the like.

The contacting of the nickel compound with the alkali metal hydride compound is carried out in the presence of a polyene electron donor. The polyene electron donors which can be employed are 1,3-butadiene, 1,5-cyclooctadiene, 1,3-cyclooctadiene, 1,5,9-cyclododecatriene, and norbornadiene.

The contacting of the alkali metal hydride with the nickel compound and polyene electron donor is preferably carried out in the presence of a catalyst formation diluent such as ethers, tertiary amines and thioethers. Ethers, including acyclic and cyclic ethers, are the preferred catalyst formation diluents. Some specific examples of catalyst formation diluents which can be employed are: diethyl ether, tetrahydrofuran, p-dioxane, diglyme, diethylsulfide, dibutylsulfide, dioctylsulfide, diphenylsulfide, triethylamine, N-methylmorpholine, tri-n-butylamine, tricyclohexylamine, and the like.

The formation of the active catalyst is carried out at a temperature of from 0 to 100° C. for a period of time ranging from a few minutes to several days, usually less than 24 hours. The mole ratio of alkali metal hydride/nickel compound should be at least 2/1 and the upper limit can be as high as 10/1. In some cases, it is advantageous to use high ratios of alkali metal hydride/nickel compound as the excess alkali metal hydride is useful as a scavenger in cleaning up the butadiene fed to the oligomerization reaction.

The amount of polyene electron donor present in the catalyst formation zone during formation of the active catalyst can vary over a wide range. Generally the mole ratio of the polyene electron donor/nickel compound will be at least 2/1 although ratios of as high as 10/1 or even higher can be employed.

Following formation of the catalyst by admixing nickel compound, alkali metal hydride and polyene electron donor, the active catalyst is employed for the oligomerization of butadiene. The oligomerization reaction is preferably carried out in the presence of a diluent. The diluent can be the same as that employed during the catalyst formation, or other inert diluents such as hydrocarbons can be employed. If desired, the ethereal catalyst formation diluent can be removed under vacuum and replaced by a hydrocarbon diluent. On the other hand, additional diluent can be added to the catalyst prior to contact with butadiene. Suitable hydrocarbon diluents which can be used during oligomerization include benzene, cyclohexane, toluene, xylene, Decalin, n-heptane and the like.

The oligomerization reaction is carried out by contacting a conjugated diene having 4 to 7 carbon atoms therein with the catalyst formed as described above. Such dienes include 1,3-butadiene, 2,3-dimethylbutadiene, isoprene, piperylene, 1,3-heptadiene, 1,3-hexadiene, 2-methyl-3-methylpiperylene, and the like. The oligomerization reaction is generally carried out at a reaction temperature of from 0 to 150° C. for a period of time ranging from a few minutes to several days, generally less than 24 hours. The amount of catalyst present in oligomerization reaction can vary over a wide range. Generally, the amount of catalyst obtained by reduction of from 0.1 to 10 grams of nickel compound will be used per 100 grams of butadiene present in the oligomerization reaction zone.

Following the oligomerization reaction, the reaction mixture can be worked up for recovery of the desired dimers and trimers by any of several available known methods. Such methods include fractional distillation, solvent extraction, crystallization and the like.

The following specific examples are intended to illustrate the advantages of the process of this invention, but it is not intended that the invention be limited to the specific features shown in these examples.

Example I

A run was carried out in which 1,3-butadiene was oligomerized by contact with the catalyst of this invention.

In this run, a 1-liter, Magnedash autoclave was charged with 1.77 grams (0.01 mole) of nickel acetate and 2.4 grams (0.05 mole) of a 50 percent by weight dispersion of sodium hydride in mineral oil. At this time, 34 grams of 1,3-butadiene was charged to the autoclave, and the autoclave was cooled in an ice bath. One hundred ml. of tetrahydrofuran was then introduced to the autoclave, after which the autoclave was heated to 60° C. and maintained at this temperature for 2 hours. At this time, the autoclave was cooled to about 15° C. and 127 grams of butadiene was charged. The pressure in the autoclave at this temperature was 35 p.s.i.g.

The electric heaters attached to the autoclave were turned on, and the autoclave was heated to 120° C., at which temperature the pressure was 240 p.s.i. This heating period required 61 minutes, and when the autoclave reached 120° C., the heaters were turned off. An exothermic reaction was occurring and the temperature rose to a maximum of 139° C. before falling slowly to 100° C. Total reaction time was one hour and 12 minutes. The reactor was then cooled and vented, and methanol was added to deactivate the catalyst present. The reaction mixture from the autoclave was then stripped of low boiling materials (diluents) and distilled to yield 3.7 grams of material boiling at 33–65° C. at 100 millimeters mercury absolute pressure, 113.7 grams of material boiling from 65° C. at 100 millimeters mercury to 92° C. at 3 millimeters mercury and 37.5 grams of residue (excluding 3 grams catalyst residue). The 3.7 gram fraction was disregarded in the calculation of conversion as a considerable amount of tetrahydrofuran appeared to be present in the fraction.

Gas-liquid chromatographic analysis of the fraction boiling from 65° C. at 100 millimeters mercury to 92° C. at 3 millimeters mercury showed that the 113.7 gram fraction contained 86.1 weight percent cyclododecatriene, 7.4 weight percent cyclooctadiene and 6.4 weight percent 4-vinylcyclohexene.

This represents a conversion of $$\frac{113.7 + 37.5}{161}$$

or 93.8 weight percent and an ultimate yield of cyclododecatriene of 65 percent $$\left[\text{calculated as } \frac{113.7\ (0.861)}{161\ (.938)}\right]$$

Example II

A run was carried out by essentially the same method employed in Example I except that 1,5-cyclooctadiene was employed as the electron donor.

In this run, the autoclave of Example I was charged with 1.77 grams of nickel acetate, 2.9 grams of a 50 percent by weight dispersion of sodium hydride in mineral oil, 18 grams of 1,5-cyclooctadiene and 100 ml. of tetrahydrofuran. The mixture was heated to 100° C. and maintained at this temperature for one hour after which the reactor was cooled to 25° C. and 127 grams butadiene was charged. The reaction mixture was then heated to 120° C. and maintained at this temperature for 4 hours and 45 minutes. One hour and 45 minutes after the reaction reached 120° C., an additional 127 grams of butadiene was charged. At the end of the reaction time, the reaction mixture was worked up in the manner described in Example I and distilled to yield 208.1 grams of colorless liquid, boiling range 60° C. at 100 millimeters to 90° C. at 3 millimeters, and 55.9 grams of residue including catalyst residue. GLC analysis of the 208.1 gram fraction showed that this material contained 78.6 weight percent cyclododecatriene, 13.6 weight percent of cyclooctadiene, 7.7 weight percent of 4-vinylcyclohexene. This represents a conversion of $$\frac{208.1 + (55.9 - 4.5) - 18}{127 + 127}$$

or 95.5 percent and an ultimate yield of cyclododecatriene of $$\frac{208.1\ (.785)}{(127 + 127)\ (.955)}$$

or 67.5 percent.

Example III

A run was carried out by essentially the same procedure as described in Examples I and II except that butadiene was injected continuously.

In this run, the autoclave of the previous examples was charged with 1.77 grams of nickel acetate, 2.9 grams of 50 percent by weight dispersion of sodium hydride in mineral oil, 100 ml. of tetrahydrofuran, and 28 grams of butadiene. This material was heated to 120° C. and maintained at this temperature for 35 minutes. At this time, a pump was started which supplied butadiene to the reactor continuously. This pump was set at approximately 105 grams per hour for one hour and 25 minutes, after which the rate was reduced to approximately 80 grams per hour. After 3 hours at 120° C., a total of 270 grams of butadiene had been charged into the reaction zone. The reaction mixture was then worked up in the manner described in Examples I and II, yielding 174.9 grams of colorless liquid, boiling from 60° C. at 100 millimeters mercury to 90° C. at 3 millimeters mercury, and 55.9 grams of residue including catalyst residue. GLC analysis of the colorless liquid showed that this material contained 86.7 weight percent of cyclododecatriene, 6.7 weight percent cyclooctadiene and 6.6 weight percent 4-vinylcyclohexene. This represents a conversion of $$\frac{174.9 + (55.9 - 4.7)}{270}$$

or 84 percent and an ultimate yield of cyclododecatriene of $$\frac{174.9\ (.867)}{270\ (.84)}$$

or 66.7 percent.

Example IV

A run was carried out by the procedure of Example I except that the catalyst components were reacted together at 100° C. for one hour prior to charging with butadiene. This run yielded 120.7 grams of material boiling from 60° C. at 100 millimeters mercury to 76° C. at 3 millimeters mercury and 26.4 grams of residue including the catalyst residue. GLC analysis of the 120.7 gram fraction showed that this material contained 89.1 weight percent cyclododecatriene, 4.3 weight percent cyclooctadiene, and 6.7 weight percent 4-vinylcyclohexene.

Reasonable variations and modifications of this invention are possible within the scope of the disclosure without departing from the spirit and scope thereof.

I claim:

1. A process for oligomerization of a conjugated diene having from 4 to 7 carbon atoms therein which comprises contacting said diene in an oligomerization zone under oligomerization conditions with a preformed catalyst system consisting essentially of the product formed by reacting (a) a nickel compound, (b) an alkali metal hydride and (c) a polyene electron donor at a temperature in the range of 0 to 100° C.

2. A process according to claim 1 wherein the oligomerization reaction is carried out at a temperature in the range of 0 to 150° C.

3. A process according to claim 1 wherein said nickel compound is a nickel salt of an organic or inorganic acid.

4. A process according to claim 1 wherein said conjugated diene is 1,3-butadiene and said catalyst system is formed by reacting nickel acetate, sodium hydride and 1,3-butadiene in the presence of tetrahydrofuran.

5. A process according to claim 1 wherein said conjugated diene is 1,3-butadiene, said nickel compound is nickel acetate, said alkali metal hydride is sodium hydride and said polyene electron donor is 1,5-cyclooctadiene.

6. A process according to claim 1 for cyclization of butadiene which comprises contacting same with a catalyst system consisting essentially of the reduction product obtained by admixing (a) a nickel compound selected from the group consisting of nickel chloride, nickel nitrate, nickel sulfate, nickel phosphate, nickel formate, nickel acetate, nickel propionate, and nickel benzoate, (b) an alkali metal hydride selected from the group consisting of sodium hydride, lithium hydride, potassium hydride, cesium hydride, rubidium hydride, lithium aluminum hydride, and sodium borohydride, and (c) a polyene electron donor selected from the group consisting of 1,3-butadiene, 1,5-cyclooctadiene, 1,3-cyclooctadiene, 1,5,9-cyclododecatriene, and norbornadiene, and thereafter recovering the cyclized butadiene compound as a product of the process.

7. A catalyst composition for the oligomerization of conjugated dienes consisting of the reaction product resulting from the reaction of (a) a nickel compound selected from the group consisting of nickel chloride, nickel nitrate, nickel sulfate, nickel phosphate, nickel formate, nickel acetate, nickel propionate and nickel benzoate with (b) an alkali metal hydride selected from the group consisting of sodium hydride, lithium hydride, potassium hydride, cesium hydride, rubidium hydride, lithium aluminum hydride, and sodium borohydride and with (c) a polyene electron donor selected from the group consisting of 1,3-butadiene, 1,5-cyclooctadiene, 1,3-cyclooctadiene, 1,5,9-cyclododecatriene and norbornadiene at a temperature in the range of 0 to 100° C. wherein the mole ratio of said alkali metal hydride to said nickel compound is in the range of 2:1 to 10:1 and the mole ratio of said polyene electron donor to said nickel compound is in the range of 2:1 to 10:1.

8. A catalyst system according to claim 7 wherein said reaction product is formed by reacting nickel acetate, 1,3-butadiene and sodium hydride.

9. A catalyst system according to claim 7 wherein said reaction product is formed by reacting nickel acetate, 1,5-cyclooctadiene and sodium hydride.

References Cited

FOREIGN PATENTS 1,140,569 12/1962 Germany.
917,103 1/1963 Great Britain.

PAUL M. COUGHLAN, JR., *Primary Examiner.*

DELBERT E. GANTZ, *Examiner.*

V. O'KEEFE, *Assistant Examiner.*